United States Patent [19]

Buckman et al.

[11] 4,176,107
[45] Nov. 27, 1979

[54] WATER-SOLUBLE DISPERSIONS OF HIGH MOLECULAR WATER-SOLUBLE POLYMERS CONTAINING A SURFACTANT AND A WATER-SOLUBLE ORGANIC CARRIER WHICH IS A HYDROXY COMPOUND CONTAINING REPEATING ALKYLENE OXIDE UNITS

[75] Inventors: John D. Buckman; Wood E. Hunter; John D. Pera; Robert M. Taylor, all of Memphis, Tenn.

[73] Assignee: Buckman Laboratories, Inc., Memphis, Tenn.

[21] Appl. No.: 871,051

[22] Filed: Jan. 20, 1978

[51] Int. Cl.$^2$ ............................................. C08L 33/02
[52] U.S. Cl. ..................... 260/29.6 E; 260/29.6 WQ
[58] Field of Search ................ 260/29.6 E, 29.6 WQ

[56] References Cited

U.S. PATENT DOCUMENTS

| | | |
|---|---|---|
| 2,982,749 | 5/1961 | Friedrich et al. ............. 260/29.6 H |
| 3,211,708 | 10/1965 | Zimmermann et al. ........ 260/29.6 E |
| 3,284,393 | 11/1966 | Vanderhoff et al. ........ 260/29.6 HN |
| 3,575,911 | 4/1971 | Peterson ......................... 260/29.6 E |
| 3,826,771 | 7/1974 | Anderson et al. ............. 260/29.6 H |
| 3,998,777 | 12/1976 | Connelly et al. ............. 260/29.6 H |
| 4,012,354 | 3/1977 | Paul ............................... 260/29.6 E |
| 4,013,606 | 3/1977 | Ballweber et al. ........... 260/29.4 UA |
| 4,054,542 | 10/1977 | Buckman et al. ............ 260/29.2 EP |

*Primary Examiner*—M. J. Welsh
*Attorney, Agent, or Firm*—Floyd Trimble

[57] ABSTRACT

This invention is related to liquid polymer compositions and to methods of preparing these compositions which comprise a high molecular weight water-soluble vinyl addition polymer, water, one or more surfactants, and a water-soluble polyalkylene glycol, or water-soluble ethoxylated alcohol, alkylphenol or fatty acid.

19 Claims, No Drawings

WATER-SOLUBLE DISPERSIONS OF HIGH MOLECULAR WATER-SOLUBLE POLYMERS CONTAINING A SURFACTANT AND A WATER-SOLUBLE ORGANIC CARRIER WHICH IS A HYDROXY COMPOUND CONTAINING REPEATING ALKYLENE OXIDE UNITS

BACKGROUND

Interest in the preparation and use of water-soluble polymers has increased dramatically in recent years because of regulations relating to pollution abatement. Various synthetic and natural water-soluble polymers exhibit superior activity in waste water clarification, flocculation, sludge dewatering, paper retention and drainage, and in petroleum recovery operations. These high molecular weight water-soluble polymers are available in three forms, namely, as solids, as dilute aqueous solutions, and as water-in-oil emulsions. High molecular weight solid water-soluble polymers are usually difficult to dissolve despite the high solubility in water. When added to water, the solid particles swell and the exterior portions of the particles become covered with a gelatinous water-polymer mixture which retards the movement of water into the particle. As a result, excessive times are required to achieve complete solubility, or else substantial loss in effectiveness in an application area will result from the incompletely dissolved polymer. To alleviate this problem, recent improvements in the art have involved the development of more rapidly dissolving water-in-oil emulsions of polyelectrolytes. However, these materials are difficult to handle, and tend to separate in the form of a polymer-poor oil phase and a polymer-rich phase. They contain hydrocarbon oils which are flammable, foul application equipment and result in cloudy solutions of slow-dissolving polymer when added to water.

Accordingly it is an object of the present invention to provide a liquid polymer composition which comprises a high molecular weight water-soluble vinyl addition polymer, water, one or more surfactants, and a water-soluble polyalkylene glycol, or water-soluble ethoxylated alcohol, alkylphenol, or fatty acid.

It is a further object to provide a method for preparing high solids dispersions of high molecular weight water-soluble polymers in a water-soluble medium.

It is a further object to provide a composition which is composed of a stable, easily handled liquid water-soluble polymer dispersion in a water-soluble medium which is non-flammable, non-toxic, which is storage-stable, and which furnishes a rapidly dissolving polymer when added to water, resulting in clear solutions.

In brief, the foregoing objects and advantages are attained by use of the new compositions of matter produced by forming a water-soluble vinyl addition polymer as a water-in-oil suspension or emulsion in an inert hydrophobic organic liquid containing at least one surfactant and subsequently a. separating the aqueous polymer phase from the oil phase and mixing the said aqueous polymer phase with water, at least one surfactant, and a water-soluble organic carrier, or b. mixing the water-in-oil suspension or emulsion with at least one surfactant and a water-soluble organic carrier and removing the inert hydrophobic organic liquid by distillation.

The nature of the invention will become more apparent to those skilled in the art by the preferred embodiments and description of the invention which follows.

The Water-Soluble Polymer

The principal ingredient of this invention is the water-soluble vinyl addition polymer having units selected from the formulas A, B, and C.

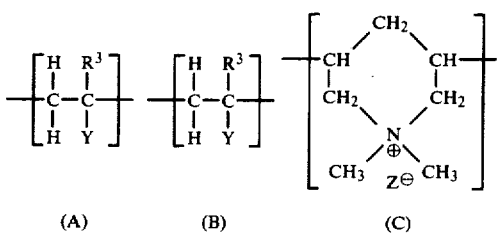

(A)     (B)     (C)

wherein X is

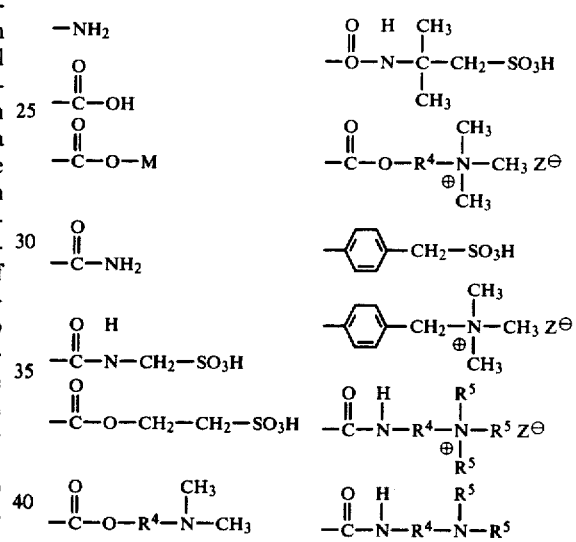

Y is phenyl, nitrile, carbomethoxy, or carboethoxy and characterized in that all of the A units may contain the same X or two or three different X groups and further characterized in that M is alkali metal, alkaline earth metal, or ammonium; $R^3$ is hydrogen or methyl;

$R^4$ is alkylene containing 1 to 4 carbon atoms; $R^5$ is lower alkyl containing 1 to 4 carbon atoms; Z is an anion, and with the proviso that unit B is present only in combination with unit A and in minor amounts.

Such materials are well known to those skilled in the art and include either solid materials or the aqueous polymer phase which results from heterogeneous polymerizations wherein an aqueous phase is dispersed in a water-insoluble organic phase. These are frequently referred to as water-in-oil polymerizations and this terminology will be used in the following text. Such polymers may be non-ionic, cationic, anionic, or amphoteric, depending upon the nature of the ethylenically unsaturated monomers which are used in their preparation.

Non-ionic, water-soluble, vinyl addition polymers result from the polymerization of acrylamide or methacrylamide. They also result from copolymerization of acrylamide or methacrylamide with other ethylenically unsaturated monomers, such as acrylonitrile, styrene, acrylate or methacrylate esters, and the like, in such proportions that the resultant polymer is water-soluble.

Anionic polymers result from the polymerization of acrylic acid or its salts, methacrylic acid or its salts, vinylbenzylsulfonic acid or its salts, 2-acrylamido-2-methylpropane sulfonic acid or its salts, or 2-sulfoethylmethacrylate or its salts, and the like. Included in this category of anionics are copolymers of the above described anionic monomers with the non-ionic monomers, acrylamide, methacrylamide, etc.

Cationic polymers are formed from dimethylaminoalkylacrylates and methacrylates and their quaternary derivatives, dimethylaminopropylmethacrylamides and quaternary derivatives, diallyldimethylammonium halides, and vinylbenzyltrialkylammonium chlorides. Similarly, copolymers of these cationic monomers with the non-ionic monomers, acrylamide, methacrylamide, etc., are included.

Included in the above definition of anionic and cationic polymers are the reaction products of non-ionic polymers with chemical reagents to furnish anionic or cationic functionality. For example, anionic functionality can be produced by hydrolysis of polyacrylamide to various degrees of acrylate content, while reaction with formaldehyde and bisulfite provides sulfonate functionality. Alternately, polyacrylamide can be reacted with hypochlorite or hypobromite by the Hoffmann reaction to give amine functionality, or reacted with formaldehyde and a dialkylamine to furnish the Mannich amine derivative. Such amines can be alkylated to form the quaternaries.

Polyampholytes contain both cationic and anionic functionality in the same polymer molecule. Such molecules can be formed by copolymerization of anionic monomers such as those listed above, with cationic monomers such as those described above. Alternately, an anionic or cationic polyelectrolyte can be chemically modified to provide the polyampholyte. For example, a copolymer of acrylamide and sodium acrylate can be reacted with formaldehyde and dialkylamine to furnish a polyampholyte containing acrylate with amine functionality.

Included in the definition of the water-soluble polymer of this invention are the products of solution polymerization and water-in-oil heterogeneous polymerization. It is essential to our invention that the polyelectrolyte be in the form of an aqueous polymer phase, preferably, as the polymer-water phase resulting from heterogeneous water-in-oil polymerization. Both the inverse suspension polymerization method of Friedrich, et. al. (U.S. Pat. No. 2,982,749), and the inverse emulsion polymerization methods of Vanderhoff, et. al. (U.S. Pat. No. 3,284,393) and Anderson, et. al. (U.S. Pat. No. 3,826,771), are included in this latter category. Particularly preferred is the polymer-water phase which results from suspension polymerization of a water-soluble vinyl monomer dispersed in a water-insoluble organic phase.

The Dispersion Medium

For purposes of our invention, the water-soluble liquid into which the polymer is dispersed is termed the carrier. Suitable carriers for the successful formation of stable dispersions include certain water-soluble liquids which possess a suitable combination of hydrophobic groups and hydrophilic groups, such that the aqueous polyelectrolyte can be suitably dispersed therein, without precipitation, dewatering, or solubilizing the polyelectrolyte. These carriers may be selected from the group consisting of

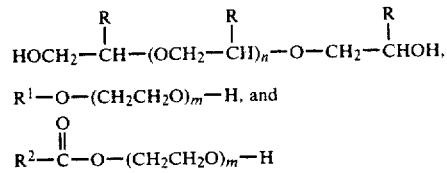

wherein R is hydrogen or methyl; $R^1$ is alkyl containing 6 to 26 carbon atoms or alkyl substituted benzene in which the alkyl substituent is branched or straight chain and contains 8 to 12 carbon atoms; $R^3$ is alkyl containing 5 to 17 carbon atoms; n varies from 2 to 20 and m varies from 3 to 10. We have found particularly effective carriers to be polyalkylene glycols such as polyethylene glycol of molecular weight equal to 200 to 600, polypropylene glycol of molecular weight equal to 150 to 1000, ethoxylated derivatives of linear alcohols, in which the ethylene oxide content ranges from three moles to seven moles, ethoxylated derivatives of alkylphenols, in which the ethylene oxide content ranges from three to ten moles, and ethoxylated derivatives of fatty acids and their derivatives which contain enough ethylene oxide to render them water-soluble.

For economic purposes, these carriers may be diluted with co-solvents which furnish water-compatible combinations. Examples of such diluents include alcohols, such as 2-ethylhexanol, 2-octanol, and 1-hydroxyalkanes, tri- and tetraethylene glycols, ethers such as the methyl, ethyl, isopropyl, or butyl ethers of glycols, ketones such as diacetone alcohol, amides such as dimethylformamide, or esters such as methoxyethyl acetate.

The Surface-Active Agent

It is an essential part of the instant invention to use suitable surface-active agents in order to disperse the aqueous water-soluble vinyl addition polymer into the water soluble dispersion medium. Those materials which have been found most effective include non-ionic, cationic, and anionic types. Examples of nonionic surface-active agents which are suitable include ethylene oxide adducts of linear alcohols and alkylphenols, sorbitan esters such as sorbitan monooleate, sorbitan monostearate, and sorbitan monopalmitate, ethoxylated sorbitan esters such as the 5–20 mole ethylene oxide adducts of sorbitan monooleate, sorbitan tristearate, or sorbitan monostearate, fatty acid esters of polyalkylene oxides such as polyethylene glycol 200 to 600 monooleate, monostearate, dioleate, or monopalmitate, and ethoxylated fatty amides such as the ethylene oxide adducts of tall oil fatty acid amide, and the like.

Examples of cationic surface-active agents include salts of long chain quaternary amines such as cetyltrimethylammonium bromide, hexadecyltrimethylammonium chloride, and octadecyltrimethylammonium chloride. Also useful are oxazoline esters of long chain fatty acids such as the oleyl ester, tall oil ester, or caprylic acid ester of oxazolines prepared from tris(hydroxymethyl)amino methane, or 2-amino-2-ethyl-1,3-propanediol. Cationic surfactants which are copolymers of olefins with N-vinylpyrrolidone also are useful.

Examples of anionic surfactants include salts of alkyl sulfates and sulfonates, such as sodium lauryl sulfate, sodium cetyl sulfonate, potassium stearyl sulfonate, or potassium stearyl sulfate, and phosphate esters of ethoxylated linear alcohols and alkylphenols.

Although some of the beneficial aspects of this invention can be obtained with one surfactant alone, it has been found that combinations of surfactants provide more efficient overall results. In particular, the use of phosphorylated derivatives of ethoxylated nonyl phenols in combination with sodium lauryl sulfate or alkyltrimethylammonium halides gives fluid dispersions with long term stability.

Having described the essential constituents of the liquid polymeric composition which forms the basis of our invention, a more detailed description of the process for forming the polymer dispersion can be set forth.

Formation of the Dispersion

In order to successfully form the dispersion of the instant invention, it is preferable to use water-swollen polymer particles. This requirement is most easily accomplished by conducting a heterogeneous water-in-oil polymerization. The water phase containing the water-swollen polymer phase is recovered from the water-oil mixture by mechanical means such as separation or distillation. Conversely, a similar polymer-water paste would result from mechanical mixing of solid polymer and water. Smooth dispersion into the carrier necessitates the use of surface active agents as components of the water-swollen polymer phase. The surface active agent of this aspect of the invention is composed of low HLB materials which are well documented in the literature. Particularly effective are sorbitan esters and their ethoxylated derivatives. These surface active agents are used in amounts of 1 percent to 20 percent based on the water-polymer composition.

Preferred amounts of water and polymer in the aqueous polymer phase range from 20 percent to 70 percent polymer and from 80 percent to 30 percent water. Percent as used throughout the specification is by weight.

In order to form the dispersion, this water-polymer phase that is stabilized with low HLB surfactant is added to a mixture of carrier, water, and dispersants, or vice-versa. This mixture or carrier phase is composed of water in the amount of 0 to 30 percent, carrier in the amount of 99.5 percent to 69.5 percent, and dispersants in the amount of 0.5 percent to 30.5 percent. The dispersant may be sodium lauryl sulfate or quaternary alkylamine halide and phosphate ester in the ratio of 1:10 to 10:1. After addition of the water-polymer phase to the carrier phase, or vice-versa, the dispersion is mixed to provide the desired fluidity. Agitation can range from mechanical agitation as provided by ordinary laboratory mixers, to homogenization, as provided by blenders, ball mills, etc.

In order to prepare the aqueous polymer phase by water-in-oil heterogeneous polymerization, any of the techniques described in the patents cited above may be used. We particularly prefer the use of the inverse suspension polymerization procedure as outlined in U.S. Pat. No. 2,982,749, utilizing suspending agents such as sorbitan esters and their ethoxylated derivatives. However, similar results are obtained when using inverse emulsion polymerization, as in Vanderhoff, or the latex polymerization procedure, as in Anderson, et. al. At completion of polymerization, the oil phase is removed by centrifugation, decantation, or distillation. This provides an aqueous-polymer phase as specified above. By conducting the inverse polymerization with an aqueous monomer concentration of 20 percent to 70 percent, the resultant polymer-water phase will be of the required composition for dispersion into the carrier as outlined above; alternately, the polymerization can be carried out at low monomer concentrations, followed by azeotropic water removal to provide the desired polymer-water phase. Once the polymer-water phase is separated by any conventional means, the formulation into the polymeric dispersion of the instant invention can be conducted as defined above.

As an alternate to the isolation or preparation of an aqueous polymer phase, the preparation of the polymeric dispersion can be conducted in one step from the water-in-oil polymer system. This approach involves addition of the carrier phase to the water-in-oil polymer suspension or emulsion. Distillation of the water-insoluble organic phase furnishes the polymeric dispersion.

Dissolving the Dispersion

The dispersion of our invention can be dissolved in water by addition of the dispersion to the water under suitable agitation. Complete solubility results. In some cases, the rate of solubilization of the dispersion can be increased by the addition of suitable surface active agents to the water, but this is not essential to the successful operation of our invention. If the use of surfactants is desired, ethoxylated linear alcohols or ethoxylated alkyl phenols can be used.

Uses

The polymers of this invention are useful in the pulp and paper industry, for treatment of municipal and industrial water and effluents, in the pretroleum industry in both drilling and production, in mineral processing, and other industries.

In the paper industry, the non-ionic, cationic and anionic water-soluble polymers may be used as drainage and retention aids. Lower molecular weight polymers and copolymers are useful as dry strength resins. Both anionic and cationic polymers may be used as retention aids but the cationic polymers are generally more useful in this area. Other uses in the paper industry include clarification of white water, as wet strength resins, and as creping aids.

Water treatment uses for both industry and municipal supplies include clarification, phosphate removal, boiler water treatment, and sludge dewatering. Municipal and industrial waste water processors may utilize these polymers for primary flocculation, sludge thickening and dewatering, elutriation, and phosphate removal. The flocculation, phospate removal, boiler water treatment and influent process water usually utilize anionic polymers. Cationics are used mainly in sludge handling operations in plants with activated sludge secondary treatment facilities.

The water-soluble polymers of this invention can be used in mineral processing to remove clay, and other fine waste particles from extracting liquors and wash water which must be recycled. These types of uses apply to processes involving copper, coal, potash, uranium, titanium dioxide, calcium carbonate, iron, zinc, gold, silver, lead, rare earth metals, feldspar, mica and quartz. The polymers are particularly useful as flocculants for clarifying waste waters at phosphate, bauxite, and barite mines.

In the petroleum industry, the water-soluble polymers of this invention can be used to lower the pumping friction, to raise the low shear viscosity to control fluid loss to the surrounding strata, and to push the oil to the pumping well. The polymers are also used in drilling muds, completion and work-over fluids, acidizing and fracturing fluids, in barrier fluids to control the water-oil ratio and in polymer flooding operations. The use of these polymers in flooding operations is becoming more important as the price of petroleum continues to increase and the availability continues to decrease. The use of these polymers behind a micellar fluid allows the petroleum producer to obtain a third crop of oil from the fields.

Other uses for the polymers of this invention include those where the products are utilized as thickeners and suspending agents in aqueous emulsions, such as water-thinned paints. Still other uses include hair sprays, gelatin substitutes for photographic applications, components of adhesives and explosive formulations, binders for sand, ores, and coal.

In order to disclose the nature of the present invention still more clearly, the following illustrative examples will be given. It is to be understood, however, that the invention is not to be limited to the specific conditions or details set forth in these examples except insofar as such limitations are specified in the appended claims.

EXAMPLE 1

Formation of Aqueous Polymer Phase

To a one-liter round bottom flask, equipped with mechanical agitator, thermometer, condenser, and nitrogen sparge tube, is added 400 g. of heptane, 7.5 g. sorbitan monooleate, and 5.5 g. of a 20 mole ethylene oxide adduct of sorbitan tristearate. With agitation of 400–1200 rpm., the monomer phase consisting of 155.1 g. acrylamide, 155.1 g. deionized water, and 0.02 g. ethylenediamine tetraacetic acid tetrasodium salt chelant is added. The suspension is heated to the reaction temperature of 45° C. under nitrogen purge, whereupon the addition of 0.04 g. of ammonium persulfate causes initiation of polymerization within 10 minutes. After the polymerization is complete (usually 3–4 hrs.), the heptane is removed from centrifugation to furnish 324 g. of white polymeric paste.

EXAMPLE 2

Formation of the Dispersion

To 16.0 g. of polymer paste of Example 1 is added a mixture of 6.0 g. of polyethylene glycol 400, 1.0 g. water, 0.1 g. of sodium lauryl sulfate, and 0.1 g. of phosphorylated ethylene oxide adduct of an alkylphenol. The mass is mixed well with a spatula to furnish a fluid, milky-white dispersion. Storage of the dispersion for one week in an oven at 50° C. resulted in no separation of phases. The dispersion (5.7 g.) was added to 200 g. of water under mechanical agitation to give a 1 percent polymer solution, which had a Brookfield viscosity of 1650 cps. and an intrinsic viscosity of 18.0 dl./g. Polyacrylamides with this intrinsic viscosity generally have a molecular weight of about five million.

EXAMPLE 3

The procedure of Example 2 was repeated except that the surfactants, sodium lauryl sulfate and the phosphorylated ethylene oxide adduct of an alkylphenol were replaced by the surfactants included in Table 1.

Table 1

| Dispersants for aqueous nonionic polymer phase | | |
|---|---|---|
| Run No. | Surfactants | Dispersion Appearance |
| 1 | ethoxylated sorbitan oleate/oleyl alcohol | smooth paste-like fluid |
| 2 | ethoxylated dodecylphenol | dewatered |
| 3 | xanthan gum | smooth, fluid liquid |
| 4 | ethoxylated fatty acid | smooth, fluid |
| 5 | phosphorylated ethoxylate | smooth, fluid |

EXAMPLE 4

The procedure of Example 2 was repeated except that the polyethylene glycol 400 was replaced by the water-soluble organic substances included in Table 2.

Table 2

| Water-soluble organic carriers used in the dispersions | | |
|---|---|---|
| Run No. | Carrier | Dispersion Appearance |
| 1 | polyethylene glycol 300 | smooth, fluid liquid |
| 2 | ethoxylated linear alcohol | smooth, fluid liquid |
| 3 | diacetone alcohol | fluid, paste-like liquid |
| 4 | polypropylene glycol 400 | thick, paste-like fluid |

EXAMPLE 5

The procedure of Example 2 was repeated except that the organic substance used was an ethoxylated linear alcohol which was mixed with various organic diluents. The results are included in Table 3.

Table 3

| Effect of diluents | | | |
|---|---|---|---|
| Run No. | Diluent | Carrier Percent | Dispersion Appearance |
| 1 | 2-ethylhexanol | 17–33 | smooth, fluid liquid |
| 2 | 1-decanol | 33–50 | fluid, liquid |
| 3 | 2-octanol | 17–33 | smooth dispersion |
| 4 | diacetone alcohol | 50 | paste-like fluid |
| 5 | dimethyl formamide | 25 | smooth, fluid liquid |

EXAMPLE 6

The procedure of Example 1 was repeated using a monomer phase consisting of 155.1 g. acrylamide, 155.1 g. deionized water, 13.3 g. of acrylic acid, 0.03 g. of ethylenediamine tetraacetic acid tetrasodium salt, and 15.5 g. of 50 percent sodium hydroxide to a monomer solution pH of 7.0. After completion of the polymerization, the polymer phase was isolated by centrifugation. Blending 13.0 g. of paste with a solution of 1.0 g. water, 0.2 g. sodium lauryl sulfate, 0.2 g. of the phosphorylated ethylene oxide adduct of an alkylphenol, and 6.0 g. polyethylene glycol 400 afforded a fluid, milky dispersion of polymer. This dispersion remained stable after 4 weeks at room temperature. A 0.25 percent aqueous solution of the polymer had a Brookfield viscosity of 500 centipoise and an intrinsic viscosity of 13.7 dl./g., which is usually indicative of a molecular weight of about eight million.

EXAMPLE 7

The procedure of Example 6 was repeated using different surfactants and the results are included in Table 4.

Table 4

| | Dispersants for aqueous anionic polymer phase | |
|---|---|---|
| Run No. | Surfactants | Dispersion Appearance |
| 1 | ethoxylated sorbitan oleate | smooth, viscous liquid |
| 2 | ethoxylated tall oil | smooth, paste-like liquid |
| 3 | ethoxylated linear alcohol | smooth, fluid liquid |
| 4 | phosphorylated linear alcohol | smooth, fluid liquid |
| 5 | sodium xylene sulfonate | dewatered |
| 6 | xanthan gum | smooth, viscous liquid |
| 7 | oleyl alcohol | dewatered |
| 8 | cetyltrimethylammonium bromide | smooth, fluid liquid |

EXAMPLE 8

Preparation of Cationic Polymer Dispersion

The experiment of Example 1 was repeated using a monomer phase composed of 150.0 g. acrylamide, 150.0 g. deionized water, and 28.0 g. of 80 percent dimethylaminoethylmethacrylate dimethyl sulfate. After polymerization, the suspension was treated with a mixture of 97.9 g. polyethylene glycol 400, 17.0 g. water, 1.7 g. cetyltrimethylammonium bromide, and 3.2 g. of the phosphorylated ethylene oxide adduct of an alkylphenol. After thorough mixing, the heptane was removed at 46° C. under vacuum. The result was a fluid, milky dispersion of cationic polymer. The Brookfield viscosity of a 1 percent solution of the polymer was 2650 centipoise which is usually indicative of a molecular weight of about two to four million.

EXAMPLE 9

The procedure of Example 8 was repeated using different surfactants and the results are included in Table 5.

Table 5

| | Dispersants for aqueous cationic polymer phase | |
|---|---|---|
| Run No. | Surfactant | Dispersion Appearance |
| 1 | cetyltrimethylammonium bromide | fluid, smooth liquid |
| 2 | hexadecyltrimethylammonium chloride | fluid, smooth liquid |
| 3 | octadecyltrimethylammonium chloride | fluid, smooth liquid |
| 4 | olefin-N-vinylpyrrolidone copolymer | fluid, smooth liquid |

EXAMPLE 10

Preparation of a Liquid Polymer from Hydrolyzed Polyacrylamide

The hydrolyzed polyacrylamide was prepared according to Example 4 of U.S. Pat. No. 3,998,777 as a water-in-oil emulsion. The oil was separated by centrifugation to leave a slightly yellow polymer paste (calculated polymer concentration in the paste of 40.4 percent), and 18.0 grams of the paste was mixed with a solution of 1.2 g. phosphorylated ethylene oxide adduct of an alkyl phenol, and 6.0 g. polyethylene glycol 400. The resultant liquid was smooth and fluid, and completely miscible with water.

EXAMPLE 11

Preparation of a Liquid Polymer from Manniched Polyacrylamide

The Mannich derivative of polyacrylamide was prepared according to Example 5 of U.S. Pat. No. 4,013,606 as a water-in-oil emulsion. The oil was separated to leave a white paste and 16.0 g. of this paste was mixed with a solution of 0.6 g. phosphorylated ethylene oxide adduct of an alkylphenol, and 6.0 g. polyethylene glycol 400. The resultant liquid was fluid and smooth.

EXAMPLE 12

The polymeric compositions described in Examples 2, 6 and 8 were tested for their effectiveness in the retention of titanium dioxide pigment in a pulp pad following the method described in Example 18 of U.S. Pat. No. 4,054,542, which disclosure is hereby made a part of this application. The percent improvement in retention was calculated using the following formula:

$$\text{Percent retention} = \frac{(\text{Ash, treated sample, g.} - \text{Ash, untreated sample, g.}) \times 100}{\text{Ash, untreated sample, g.}}$$

The increase in retention was significant in every case, and increases were better or equal to those obtained with commercial retention aids in most instances. The results are tabulated in Table 6.

Table 6

| Improvement in retention of titanium dioxide | | | |
|---|---|---|---|
| Polymer Dispersion | Test | Use Rate Pound per ton of pulp | Improvement in Retention Percent |
| From Example 2 | A | 0.5 | 2.8 |
| | A | 0.75 | 6.0 |
| | B | 1.0 | 19.0 |
| From Example 6 | A | 0.5 | 20.0 |
| | B | 1.0 | 13.9 |
| From Example 8 | A | 0.5 | 17.8 |
| | B | 1.0 | 19.0 |

Test A - pH of pulp-TiO$_2$ slurry was 7
Test B - pH of pulp-TiO$_2$ slurry was adjusted to pH 4.7 with alum

EXAMPLE 13

The polymeric compositions described in Examples 2, 6 and 8 were tested as flocculants using a mixture of pulp and clay. The procedure used is the one described in Example 19 of U.S. Pat. No. 4,054,542, which disclosure is hereby made a part of this application. The flocculating properties of all of the polymers were significant and the results were better or equivalent in most cases to those obtained with commercial flocculating agents.

The invention having thus been described, what is claimed and desired to be secured by Letters Patent is:

1. A composition comprising a water-soluble vinyl addition polymer, water, at least one surfactant and a water-soluble organic carrier selected from the group consisting of

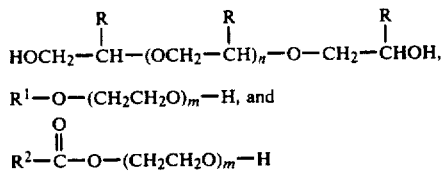

wherein R is hydrogen or methyl; $R^1$ is alkyl containing 6 to 26 carbon atoms or alkyl substituted benzene in which the alkyl substituent is branched or straight chain and contains 8 to 12 carbon atoms; $R^2$ is alkyl containing 5 to 17 carbon atoms; n varies from 2 to 20 and m varies from 3 to 10.

2. The composition of claim 1 wherein the water-soluble vinyl addition polymer has units selected from the formulas A, B and C.

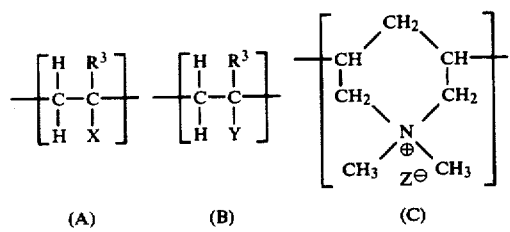

wherein X is

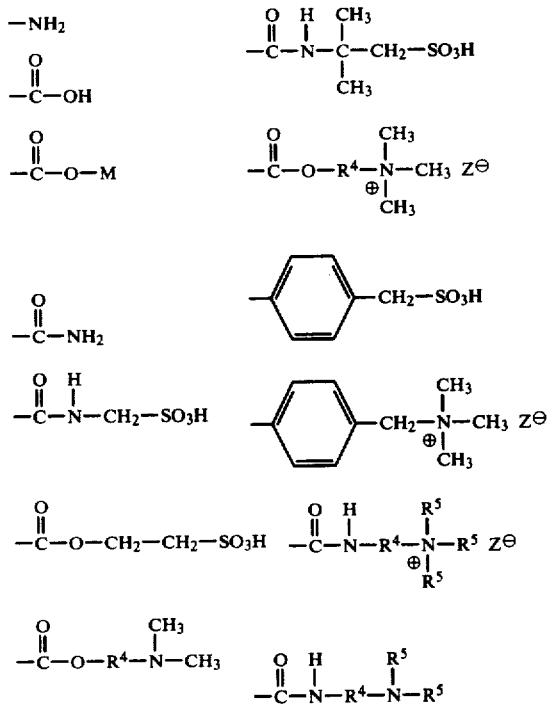

Y is phenyl, nitrile, carbomethoxy, or carboethoxy and characterized in that all of the A units may contain the same X or two or three different X groups and further characterized in that M is alkali metal, alkaline earth metal, or ammonium; $R^3$ is hydrogen or methyl
$R^4$ is alkylene containing 1 to 4 carbon atoms; $R^5$ is lower alkyl containing 1 to 4 carbon atoms; Z is an anion, and with the proviso that unit B is present only in combination with unit A and in minor amounts.

3. The composition of claim 1 wherein the surfactant is selected from the group of nonionic, anionic, and cationic surfactants.

4. The composition of claim 1 wherein the water-soluble vinyl addition polymer has a repeating unit of the formula

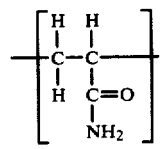

5. The composition of claim 1 wherein the water-soluble vinyl addition polymer has a repeating unit of the formula

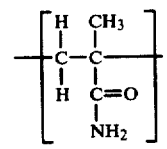

6. The composition of claim 1 wherein the water-soluble vinyl addition polymer contains the units of the formula

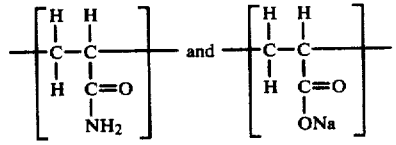

7. The composition of claim 1 wherein the water-soluble vinyl addition polymer contains the units of the formula

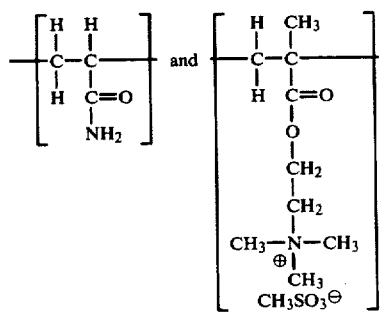

8. The composition of claim 1 wherein the water-soluble vinyl addition polymer contains the units of the formula

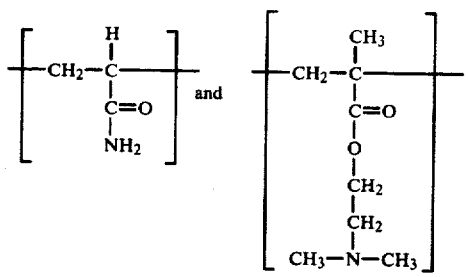

9. The composition of claim 1 wherein the water-soluble organic carrier is polyethylene glycol with a molecular weight of from 200 to 700.

10. The composition of claim 1 wherein the water-soluble vinyl addition polymer contains the unit

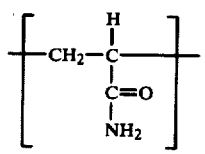

the surfactants are sodium lauryl sulfate and phosphorylated ethylene oxide adduct of an alkylphenol, and the water-soluble organic carrier is polyethylene glycol having a molecular weight of about 400.

11. The composition of claim 1 wherein the water-soluble vinyl addition polymer contains the units

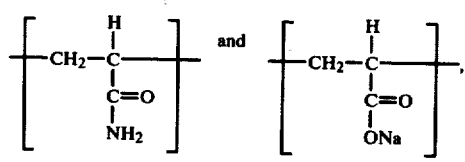

the surfactants are sodium lauryl sulfate or alkyltrimethylammonium halide and phosphorylated ethylene oxide adduct of an alkylphenol, and the water-soluble organic carrier is polyethylene glycol having a molecular weight of about 400.

12. The composition of claim 1 wherein the water-soluble vinyl addition polymer contains the units

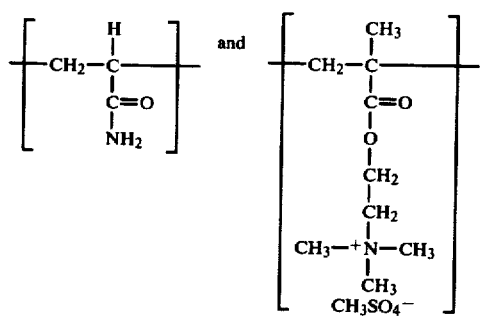

the surfactants are sodium lauryl sulfate and a phosphorylated ethylene oxide adduct of an alkylphenol, and the water-soluble organic carrier is polyethylene glycol having a molecular weight of about 400.

13. The method of preparing the liquid polymeric composition of claim 1 wherein a water-soluble vinyl addition polymer is formed as a water-in-oil suspension or emulsion in an inert hydrophobic organic liquid containing at least one surfactant and subsequently a. separating the aqueous polymer phase from the oil phase and mixing the said aqueous polymer phase with water, at least one surfactant and a water-soluble organic carrier; or b. mixing the water-in-oil suspension or emulsion with at least one surfactant and a water-soluble organic carrier and removing the inert hydrophobic organic liquid by distillation wherein the said water-soluble organic carrier is selected from the group consisting of

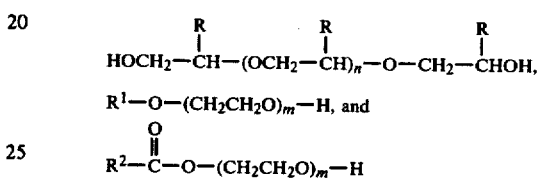

wherein R is hydrogen or methyl; $R^1$ is alkyl containing 6 to 26 carbon atoms or alkyl substituted benzene in which the alkyl substituent is branched or straight chain and contains 8 to 12 carbon atoms; $R^2$ is alkyl containing 5 to 17 carbon atoms; n varies from 2 to 20 and m varies from 3 to 10.

14. The method for preparing the liquid polymeric composition of claim 13 wherein the water-soluble vinyl addition polymer has a repeating unit of the formula

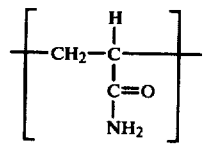

15. The method for preparing the liquid polymeric composition of claim 13 wherein the water-soluble vinyl addition polymer contains the units of the formula

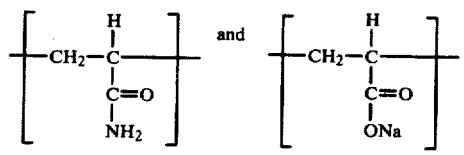

16. The method for preparing the liquid polymeric composition of claim 13 wherein the water-soluble vinyl addition polymer contains the units of the formula

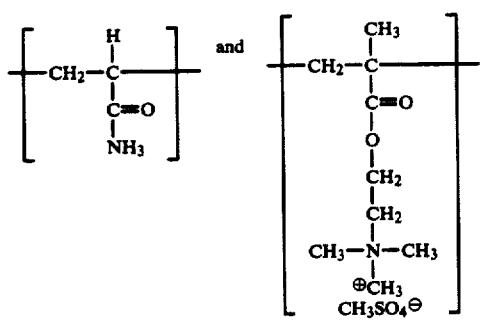 and

17. The method for preparing the liquid polymeric composition of claim 13 wherein the water-soluble vinyl addition polymer has a repeating unit of the formula

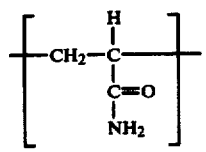

the surfactants are sodium lauryl sulfate and a phosphorylated ethylene oxide adduct of an alkylphenol, and the water-soluble organic carrier is polyethylene glycol having a molecular weight of about 200 to about 700.

18. The method for preparing the liquid polymeric composition of claim 13 wherein the water-soluble vinyl addition polymer contains the units

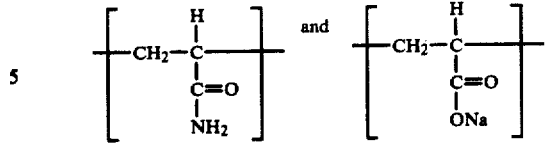

the surfactants are sodium lauryl sulfate or alkyltrimethylammonium halide and phosphorylated ethylene oxide adduct of an alkylphenol and the water-soluble organic carrier is polyethylene glycol having a molecular weight of about 200 to about 700.

19. The method for preparing the liquid polymeric composition of claim 13 wherein the water-soluble vinyl addition polymer contains the units

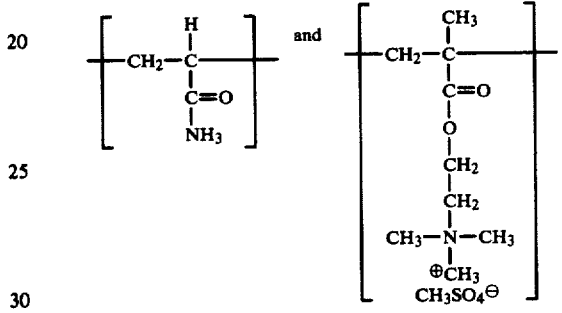

the surfactants are sodium lauryl sulfate and a phosphorylated ethylene oxide adduct of an alkylphenol and the water-soluble organic carrier is polyethylene glycol having a molecular weight of about 200 to about 700.

* * * * *